United States Patent
Okawara (10) Patent No.: US 7,306,771 B2
(45) Date of Patent: Dec. 11, 2007

(54) FILTER CATALYST FOR PURIFYING EXHAUST GASES AND ITS MANUFACTURING METHOD THEREOF

(75) Inventor: Seiji Okawara, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 624 days.

(21) Appl. No.: 10/660,707

(22) Filed: Sep. 12, 2003

(65) Prior Publication Data

US 2004/0053781 A1    Mar. 18, 2004

(30) Foreign Application Priority Data

Sep. 13, 2002 (JP) ............... 2002-268245

(51) Int. Cl.
*B01D 53/34* (2006.01)
*B01D 39/20* (2006.01)
*C01J 3/84* (2006.01)

(52) U.S. Cl. ............ 422/177; 422/178; 422/180; 422/168; 502/527.13; 502/527.12; 55/523; 48/128

(58) Field of Classification Search ........... 422/177, 422/178, 180; 55/523; 502/527.13, 527.12
See application file for complete search history.

(56) References Cited

U.S. PATENT DOCUMENTS 4,340,403 A * 7/1982 Higuchi et al. ............ 55/523
2003/0007904 A1 * 1/2003 Tonkovich et al. ......... 422/180
2003/0021745 A1 * 1/2003 Chen ......................... 423/239.1

FOREIGN PATENT DOCUMENTS

| DE | 100 48 511 | 4/2002 |
|---|---|---|
| EP | 0 766 993 | 4/1997 |
| EP | 0 834 343 | 4/1998 |
| JP | 06-159037 | 6/1994 |
| JP | 9-94434 | 4/1997 |
| JP | 09-173866 | 7/1997 |
| JP | 09-220423 | 8/1997 |
| JP | 9-276708 | 10/1997 |
| JP | 2001-314764 | 11/2001 |
| WO | WO 00/01463 | 1/2000 |

* cited by examiner

*Primary Examiner*—Glenn Caldarola
*Assistant Examiner*—Kaity Handal
(74) *Attorney, Agent, or Firm*—Finnegan, Henderson, Farabow, Garrett & Dunner, LLP (57) ABSTRACT

A filter catalyst for purifying exhaust gases having a catalytic layer comprising the first catalyst support 2 having an average particle diameter of 1 μm or less, the second catalyst support 3 having an average particle diameter from ¹⁄₂₀ to ½ of the average pore diameter of the filter cellular walls 12 and catalytic ingredients, on the filter cellular walls 12 having an average pore diameter of from 20 to 40 μm, and the catalytic layer having uneven surfaces is used. Since the second catalyst support hardly enters into the pore with a diameter of 20 μm or less, it exists partly on the filter cellular walls and the inside surface of the wall. Therefore, since particles collide with the convex part of the catalytic layer, it becomes possible to collect them easily and the collecting rate for particles and the ability of the particles purification are improved.

15 Claims, 4 Drawing Sheets

FILTER CATALYST FOR PURIFYING EXHAUST GASES AND ITS MANUFACTURING METHOD THEREOF

BACKGROUND OF THE INVENTION

1. Field of the Invention

The present invention relates to a filter catalyst for purifying exhaust gases containing particulates, such as those emitted from diesel engines, and a manufacturing method thereof.

2. Description of the Related Art

Regarding gasoline engines, harmful components in the exhaust gases have been reduced securely by the strict regulations and the technology developments capable of coping with them. However, regarding diesel engines, the regulations and the technology developments have been advanced less compared to those of gasoline engines because of the unique circumstances that the harmful components are emitted as particulates (i.e., particulate matters, such as carbonaceous fine particles, sulfuric fine particles like sulfates, and high-molecular weight hydrocarbon fine particles, hereinafter collectively referred to as "PMs").

As exhaust-gas purifying apparatuses having been developed so far for diesel engines, the followings have been known. For example, the exhaust-gas purifying apparatuses can be roughly divided into trapping (or wall-flow) exhaust-gas purifying apparatuses and open (or straight flow) exhaust-gas purifying apparatuses. Among these, clogged honeycomb structures made from ceramic (i.e. diesel PMs filters, hereinafter referred to as "DPFs") have been known as one of the trapping exhaust-gas purifying apparatuses. In the DPFs, the honeycomb structures are clogged at the opposite openings of cells in a checkered manner alternately, for instance. The DPFs comprise inlet cells clogged on the downstream side of the exhaust gases, outlet cells clogged neighboring the inlet cells and clogged on the upstream side of the exhaust gases, and filter cellular walls demarcating the inlet cells and the outlet cells. In the DPFs, the exhaust gases are filtered by the pores of the filter cellular walls to collect PMs.

In the DPFs, however, the pressure loss increases as PMs deposit thereon. Accordingly, it is needed to remove deposited PMs regularly to recover the DPFs, somehow. Hence, when the pressure loss increases, deposited PMs have been burned with burners or electric heaters conventionally to recover the PMs. However, the more the deposition mass of PMs is, the higher the temperature rises in burning deposited PMs. Consequently, there might arise cases that the DPFs are damaged by thermal stress caused by the temperature rise.

Hence, continuously regenerative DPFs have been developed recently. In the continuously regenerative DPFs, a coating layer comprising alumina is formed on the surface of the filter cellulr walls of the DPFs, and a catalytic ingredient such as platinum (Pt) is loaded on the coating layer. In accordance with the continuously regenerative DPFs, since the collected PMs are oxidized and burned by the catalytic reaction of the catalytic ingredient, it is possible to regenerate the DPFs by burning PMs simultaneously with or successively after collecting PMs. Moreover, since the catalytic reaction occurs at low temperature, and since it is possible to burn PMs when they are collected less, the continuously regenerative DPFs have an advantage that the thermal stress onto the DPFs is so less that the DPFs are inhibited from being damaged.

For example, Japanese Unexamined Patent Publication (KOKAI) No. 9-173,866 discloses such a continuously regenerative DPFs with a filter cellular wall on which a porous coating layer comprising activated alumina with a particle diameter larger than the average pore diameter of the filter cellular wall is formed, and the inside of the pore is coated with activated alumina with a particle diameter less than the average pore diameter of the filter cellular wall and further, catalytic ingredients are loaded thereon. In accordance with the continuously regenerative DPFs, it is possible to make the pressure loss relative small to the increase of specific surface area of the porous coating layer.

Moreover Japanese Unexamined Patent Publication (KOKAI) No. 9-220,423 discloses such a continuously regenerative DPFs whose filter cellular wall exhibits a porosity of from 40 to 65% and an average pore diameter of from 5 to 35 µm, and whose coating layer is formed of a porous oxide. In the porous oxide, particles with a diameter less than the average pore diameter of the filter cellular wall occupy 90% by weight or more. When such a porous oxide with a large specific surface area is coated on DPFs, it is possible to form the coating layer not only on the surface of the filter cellular walls but also on the inner surface of the pores. Moreover, on the condition that the coating layer is coated in a fixed amount, it is possible to make the thickness of the coating layer thinner. Accordingly, it is possible to inhibit the pressure loss from enlarging.

Moreover, Japanese Unexamined Patent Publication (KOKAI) No.6-159,037 discloses a continuously regenerative DPF whose coating layer is further loaded with an $NO_x$ sorbent. With the arrangement, $NO_x$ can be sorbed in the $NO_x$ sorbent. Consequently, when a reducing agent such as diesel oil is sprayed, it is possible to reduce the sorbed $NO_x$ to purify.

However, continuously regenerative DPFs have a problem with the limited activity. Specifically, it is impossible to increase the loading amount of catalytic ingredient because the coating amount of the coating layer is limited in view of the pressure loss. On the other hand, when a large amount of catalytic ingredient is loaded on a thin loading layer, the loading density of catalytic ingredient is enlarged so that the granular growth of catalytic ingredient occurs at high temperatures. As a result, continuously regeneration DPFs are deteriorated in terms of the durability.

For example, in the technique mentioned in Japanese Unexamined Patent Publication (KOKAI) No.9-173,866, the coating layer is formed by wash-coating the slurry prepared from a blended powder of alumina with a large particle diameter and a small diameter on the DPFs. In this manner, however, there are some large particles entering into the pore, and therefore, it has a possibility that these particles, together with small particles, may clog the pores, which leads the increase of the pressure loss. When the amount of coating is reduced in order to inhibit the increase of the pressure loss, the loading density of catalytic ingredient is enlarged so that the granular growth of catalytic ingredient occurs. As a result, the durability of the continuously regenerative DPFs deteriorates.

Moreover, in the continuously regenerative DPFs whose coating layer contains an $NO_x$ sorbent, when the amount of coating is insufficient, the reaction such as solid solution of the $NO_x$ sorbent to a filter substrate material leads the problem that the ability of the $NO_x$ purification is deteriorated. As the amount of coating is increased, the reaction of the $NO_x$ sorbent to a filter substrate material can be suppressed, but, because of the choke of pores the probability of catalytic reaction of the $NO_x$ sorbent to exhaust gases is decreased, and the ability of $NO_x$ purification is also deteriorated. Moreover, the pressure loss rises and the PM collecting rate decreases.

By the way, in the circumstances that the PMs are collected in the pores of the filter cellular walls, the oxidation reaction of PMs proceeds smoothly because the probability of catalytic reaction of catalytic ingredients to PMs is high and the heat retaining property is well. Moreover, it is possible to estimate the deposition amount of PMs by detecting the pressure loss because the pressure loss increases sensitively according as the PMs are collected. Therefore, by executing the regeneration process such as streaming high temperature exhaust gases when the pressure loss exceeds a reference value, it is possible to burn PMs in the deposition amount within a reference amount, and thus to prevent the temperature of the continuously regenerative DPFs from rising high at the time of burning.

However, under a low temperature or the condition that a large amount of PMs are exhausted continuously, since the speed of deposition for PMs becomes larger than that of oxidation reaction, PMs are deposited and form a layer along the filter cellular wall. Since a deposition layer formed on the surface of the filter cellular wall by PMs is oxidized only on the boundary between the filter cellular wall and the deposition layer in ordinary conditions, a clearance is formed between the deposition layer and the filter cellular wall, and the rate of the pressure loss becomes relatively small with respect to the increase of the deposition amount, thereby lowering the sensitivity for the detection of the pressure loss. Therefore, a method for estimating the amount of PMs deposition by detecting the pressure loss has the error that the estimated PMs deposition amount differs much from a real deposition amount.

Once a clearance is formed between the deposition layer and the filter cellular wall, the surface of deposition layer is not brought into contact with the catalytic ingredient. Therefore, the rate of oxidation for PMs lowers, and the deposition is promoted on the surface, and the amount of deposition becomes extremely large. As a result, when the temperature of exhaust gas rises, the deposited PMs are burned all at once, and the temperature of the continuously regenerative DPFs become high, so that the problems that the catalytic ingredient is deteriorated by the granular growth of catalytic ingredient or the damages of filter substrate by dissolution occurs.

SUMMARY OF THE INVENTION

In view of these backgrounds the present invention has been developed. It is an object of the present invention is to improve the PMs purification ability and to suppress the deterioration of the sensitivity for detection of pressure loss.

A filter catalyst for purifying exhaust gases according to the present invention can achieve the aforementioned object. The present filter catalyst for purifying exhaust gases comprises:

a honeycomb structure including:
  inlet cells clogged on the downstream side of the exhaust gases;
  outlet cells neighboring the inlet cells and clogged on the upstream side of the exhaust gases;
  filter cellular walls demarcating the inlet cells and outlet cells, and having pores of an average pore diameter of from 20 to 40 µm; and
  a catalytic layer formed on the filter cellular walls and on the inside surface of the pores, and having:
    a first catalyst support consisting of porous oxide with an average particle diameter of 1 µm or less;
    a second catalyst support consisting of the porous oxide with an average particle diameter within a range from 1/20 to 1/2 of the average pore diameter of the filter cellular walls; and
    a catalytic ingredient; and
  the catalytic layer having parts where the second catalyst support exists and other parts where the second catalyst support does not exist and having uneven surfaces.

It is especially desirable that the second catalyst support is loaded on the layer formed by the first catalyst support. It is further desirable that the porosity of the filter cellular walls is from 60 to 80%.

It is desirable that the catalytic layer contains an $NO_x$ sorbent which is selected from alkali metals, alkali earth metals or rare-earth elements, or an $NO_x$-absorbing member which adsorbs $NO_x$ under low temperatures and release $NO_x$ under high temperatures, and is loaded at least on one of the first and the second catalyst supports.

Further a manufacturing method of a filter catalyst for purifying exhaust gases according to the present invention comprises steps of;

preparing a honeycomb structure including;
  inlet cells clogged on the downstream side of the exhaust gases;
  outlet cells neighboring the inlet cells and clogged on the upstream side of the exhaust gases; and
  filter cellular walls demarcating the inlet cells and outlet cells, and having pores of an average pore diameter of from 20 to 40 µm;

forming a first catalytic layer on the filter cellular walls by wash-coating a slurry including mainly the porous oxide with an average particle diameter of 1 µm or less; and forming a second catalytic layer on the filter cellular walls by wash-coating a slurry including mainly the porous oxide with an average particle diameter within a range from 1/20 to 1/2 of the average pore diameter of the filter cellular walls.

The filter catalyst for purifying exhaust gases of the present invention can enhance the purification ability for PMs and can suppress the deterioration of sensitivity for the pressure loss.

DETAIL DESCRIPTION OF THE PREFERENCE EMBODIMENTS

Having generally described the present invention, a further understanding can be obtained by reference to the specific preferred embodiments which are provided herein for the purpose of illustration only and not intended to limit the scope of the appended claims.

In the filter catalyst for purifying exhaust gases of the present invention, a honeycomb structure which includes the filter cellular walls having pores of average pore diameter of from 20 to 40 μm is used, and the catalytic layer including the first catalyst support consisting of the porous oxide with an average particle diameter of 1 μm or less, the second catalyst support consisting of the porous oxide with an average particle diameter within a range of from 1/20 to 1/2 of the average pore diameter of the filter cellular walls and a catalytic ingredient being formed on the filter cellular walls. As the first catalyst support has an average particle diameter of 1 μm or less, which is extremely fine compared with the average pore diameter of the filter cellular walls (i.e. 20-40 μm), the first catalyst support enters easily into the pores of filter cellular walls to form a thin coating layer on the inside surface of pore when the filter cellular walls are wash-coated. Therefore, it is possible to suppress the increase of pressure loss and deterioration of PMs collecting rate by regulating the amount of coating. Moreover, since the probability of catalytic reaction of catalytic ingredient to PMs becomes high, the purification ability for PMs is improved. In addition, since the probability of catalytic reaction of catalytic ingredient to harmful gas component becomes high, the purification ability for HC, CO and $NO_x$ is also improved.

On the other hand, the average particle diameter of the second catalyst support is larger than that of the first catalyst support and is within the range of from 1/20 to 1/2 of the average pore diameter of the filter cellular walls, which means the second catalyst support has relative large particle diameter of from 1 to 20 μm. For this reason, the second catalyst support is hard to enter into pores with diameter of 20 μm or less, and is apt to distribute on the filter cellular walls or on the inside surface of the pores with a large pore diameter. Thus the total catalyst support forms an uneven catalytic layer which is thick where the second catalyst support exists and thin where it does not exist. Thereby, because PMs collide with the convex part of the catalytic layer, it becomes possible to collect them easily and the collecting ratio for PMs and the ability of PMs purification are improved. Furthermore, the pressure loss comes to increase sensitively according as the amount of collected PMs increases without saturation and the deterioration of sensitivity for the detection of the pressure loss is suppressed.

Moreover, the loading density of catalytic ingredient becomes low where the second catalyst support forms partly thick parts of the catalytic layer. Therefore, when the $NO_x$ sorbent is loaded thereon, it is possible to suppress the reaction of $NO_x$ sorbent to the filter cellular walls. As a result, the durability of purification ability is improved as compared with the case of homogenous loading density of catalytic ingredient.

The average pore diameter of filter cellular walls, by the way, can be calculated from the image processing for microphotograph of the cross-sections.

The honeycomb structure comprises inlet cells clogged on the downstream side of the exhaust gases, outlet cells neighboring the inlet cells and clogged on the upstream side of the exhaust gases and filter cellular walls demarcating the inlet cells and the outlet cells.

The aforementioned honeycomb structure can be manufactured out of heat-resistant ceramics such as cordierite. It can be manufactured, for example, by preparing the clayed slurry including mainly the powder of cordierite, forming it by extruder and calcining. It is also possible to blend the powder of alumina, magnesia or silica instead of the powder of cordierite so that the composition of the powder becomes that of cordierite. Then it is possible to manufacture the honeycomb structure by clogging the one opening cell at one side in a checkered manner alternately with the same clayed slurry or like that, and, at the other side, clogging the opening of the cell neighboring the cell which has been clogged at one side, and after that, fixing the clogging member by means of calcining or so.

It is possible to form pores with an average pore diameter of from 20 to 40 μm on the filter cellular walls by blending inflammable powder like carbon powder, wood powder, starch or resin powder in the slurry mentioned above and burning them away as the honeycomb structure is calcining. It is possible to control the pore diameter and the porosity by adjusting the particle diameter and the additional amount of the inflammable powder. The inlet cells and the outlet cells are connected with these pores and PMs are collected in the pores, but the gases can pass through these pores from the inlet cells to outlet cells. It is not preferable that the average pore diameter of the filter cellular walls is less than 20 μm, because the pores with a small diameter are clogged by the particles of the first catalyst support. If the average pore diameter of the filter cellular walls exceeds 40 μm, it is sometimes impossible to use practically, since the strength of honeycomb structure is lowered.

It is desirable that the porosity should be from 60 to 80%. If the porosity is set in this range, the increase of pressure loss can be suppressed even though 100~200 g/L of catalytic layer is formed, and the deterioration of the strength can also be suppressed. Moreover, it is possible to collect PMs more efficiently.

The catalyst layer comprising the first and the second catalyst supports and a catalytic ingredient is formed on the filter cellular walls and the inside surface of pores. The first and the second catalyst supports comprise porous oxides for which $Al_2O_3$, $ZrO_2$, $CeO_2$, $TiO_2$ and $SiO_2$ or composite oxide of these oxides can be used. The materials of the first and second catalyst supports may be either the same with or different from each other. It is desirable that the composition ratio of the first and second catalyst supports in weight should be in the range as follows, the first catalyst supports: the second catalyst supports =5:1~1:5. When the first catalyst support is more than this range, small pores on the filter cellular walls are clogged and the pressure loss is enlarged sometimes. When the second catalyst support is less than this range, the effect of the uneven formation can be obtained very little. On the other hand, the first catalyst support is less than this range, since the possibility of catalytic reaction of the catalytic ingredient to PMs becomes small, the purification ability for PMs is lowered.

In order to form the catalytic layer, the slurry comprising the oxide powder or the composite oxide powder together with water and binder component like alumina-sol may be coated on the filter cellular walls and burned. In order to coat the slurry on the filter cellular walls, ordinary dipping can be used, although, it is desirable that the pores of the filter cellular walls should be forced to be filled with the slurry by air blowing or suction and the remains of the slurry in the pores should be removed.

The first catalyst support has particles with an average diameter of 1 μm or less and the second catalyst support has particles with an average diameter within a range from 1/20 to 1/2 of the average pore diameter of the filter cellular walls. When the slurry including the mixed powder of the first and second catalyst supports is prepared to form the catalytic layer by means of the wash-coating method, since the average pore diameter of the filter cellular walls ranges from 20 to 40 μm, the first catalyst support still enters easily into the pore with a diameter of 20 μm or less and is coated homogeneously on the surface of the filter cellular walls and the inside surface of the pores. On the other hand, since the second catalyst support comprises the particles which are too large to enter into the pores with a diameter of 20 μm or less, it adheres partly on the filter cellular walls and on the inside surface of the pores with a relatively large diameter. Thus an uneven catalytic layer is formed, which is thin where the second catalyst does not exist and is thick where it exists.

It is favorable to form from 100 to 200 g of catalytic layer per 1 L of honeycomb structure. When the catalytic layer is less than 100 g/L, deterioration of the durability for ability to sorb $NO_x$ is inevitable when an $NO_x$ sorbent is coated on. When it exceeds 200 g/L, it is impractical because the pressure loss becomes too large.

In the manufacturing method of the present invention in which the operation mentioned above can be obtained more effectively, at first, the first catalytic layer is formed on the filter cellular walls by wash-coating the slurry which mainly includes the first catalyst support whose particle diameter is 1 μm or less and, next, the second catalytic layer is formed on the filter cellular walls by wash-coating the slurry which mainly includes the second catalyst support whose particle diameter is within the range from 1/20 to 1/2 of the average pore diameter of the filter cellular walls. When the first catalytic layer is formed, fine particles of the first catalyst support adhere on the surface of the filter cellular walls and almost of the inside surface of the pores. When the second catalytic layer is formed, it is suppressed that particles of second catalyst support enter into the pore having a diameter of 20 μm or less, because the particles of second catalyst support is large and furthermore first catalyst layer formed in the pores makes the diameter of the pores smaller. Therefore the second catalyst support is distributed partly on the surface of the first catalytic layer at the filter cellular walls and at the inside of the large pores and forms uneven surfaces.

Thus, according to the manufacturing process of present invention, it is possible reliably to form the uneven surface of catalytic layer and to enhance more the effect and operation of the present invention of filter catalyst for purifying exhaust gases mentioned above.

In the manufacturing process of the present invention, it is favorable that the amount of coating of the first catalytic layer is from 30 to 150 g per 1 L of honeycomb structure. If the amount of the first catalytic layer is less than 30 g/L, the deterioration of durability for the ability to sorb $NO_x$ is inevitable when $NO_x$ sorbent is coated on, and if it exceeds 150 g/L, small pores are clogged and the pressure loss rises. On the other hand, it is favorable that the amount of coating of the second catalytic layer is from 30 to 150 g per 1 L of honeycomb structure. If the amount of the second catalytic layer is less than 30 g/L, the effect of the uneven surface cannot be obtained. If it exceeds 150 g/L, small pores are clogged and the pressure loss then rises rapidly. For the reason mentioned above, it is favorable that the amount of the first and the second catalytic layers in total is from 100 to 200 g per 1 L of honeycomb structure.

It can be utilized as the catalytic ingredient as long as it can reduce $NO_x$ by catalytic reaction and in addition enhance the oxidation for PMs. However it is favorable to use at least one or more catalytic ingredients selected from noble metals like platinum group such as Pt, Rh or Pd. It is favorable that the amount of noble metals to be loaded is within the range of 1 to 5 g per 1 L volume of honeycomb structure. If the amount of loading is less than this range, it is too inactive to use practically, while the amount more than this range is loaded, activity will saturate and, it costs high.

The noble metals can be loaded on the coating layer comprising the powder of oxide or the composite oxide by an absorption method or an impregnating method, using with the solution in which nitrate of noble metals or the like is dissolved. Otherwise the catalytic layer can be formed with the powder of oxide or the composite oxide on which noble metals are loaded in advance.

It is desirable that the catalytic layer should contain the $NO_x$ sorbent, which is selected from alkali metals, alkali earth metals or rare-earth elements, and is loaded on at least one of the first and the second catalyst supports. If the catalytic layer contains the $NO_x$ sorbent, since $NO_2$ produced by the oxidation of catalytic ingredient can be sorbed in the $NO_x$ sorbent, the purification activity for $NO_x$ is further improved. It is possible to choose for the $NO_x$ sorbent from alkali metals like K, Na, Cs or Li, alkali earth metals like Ba, Ca, Mg or Sr or rare-earth elements like Sc, Y, Pr or Nd. It is desirable particularly to choose at least one kind selected from alkali metals or alkali earth metals, whose ability to sorb $NO_x$ are outstandingly high.

It is favorable that the amount of loading for the $NO_x$ sorbent is within the range of 0.15 to 0.45 mol per 1 L volume of honeycomb structure. When the amount of loading is smaller than this range, it is too inactive to use practically. On the other hand, if the amount larger than this range is loaded, since the $NO_x$ sorbent covers the noble metals, the catalytic activity is deteriorated. The $NO_x$ sorbent can be loaded on the coating layer comprising the first and the second catalyst supports by the impregnating method or so on, using with the solution in which acetate or nitrate is dissolved. Alternatively, the catalytic layer can be formed with the powder of oxide or the composite oxides on which the $NO_x$ sorbent is loaded in advance.

It is desirable that the $NO_x$ sorbent should be loaded at least on the second catalyst support. Since the catalytic layer is thick at the part where the second catalyst support exists, the reaction of the $NO_x$ sorbent to the filter cellular walls can be suppressed and the durability of purification ability for $NO_x$ is improved.

It is also preferable that the catalytic layer contains an $NO_x$-adsorbing member which adsorbs $NO_x$ under low temperatures and releases the $NO_x$ under high temperatures. In the lower temperature range, NO in the exhaust gases is adsorbed as $NO_2$ in the $NO_x$-adsorbing member and, in the high temperature range, the oxidation-purification for PMs are enhanced by $NO_2$ released from the $NO_x$-adsorbing member. It is possible to use the zirconia powder or the powder of $CeO_2$ on which rare metals are loaded, for this $NO_x$-adsorbing member.

It is also preferable to load an $NO_x$ sorbent together with catalytic ingredient on the downstream side of the $NO_x$-adsorbing member. Thereby, NO produced by the reaction with PMs is sorbed by the $NO_x$ sorbent on the downstream side and reduced to be purified. In addition, since the $NO_x$ sorbent is not loaded on the upstream side, no reaction of the NO$_x$ sorbent to the filter cellular walls occurs at the upstream side. Therefore it is possible to make the thickness of the catalytic layer thinner and therefore the pressure loss can be suppressed as a result.

EXAMPLES

The followings explain the concrete examples of the present invention.

Test Example

A straight honeycomb-shaped substrate which had a diameter of 129 mm, a length of 150 mm and a volume of about 2,000 cm$^3$ and comprised square-shaped cells in a quantity of 300 cells/inch$^2$ was prepared. The substrate had a porosity of 65% and pores with an average pore diameter of 23 μm.

Next, stable and shape-retaining creamy paste was prepared by mixing predetermined amounts of organic binder and water with the powder of cordierite composition comprising alumina, talc, kaolin and silica. With the resulting paste, upstream plugs were formed, using a paste injector (dispenser) with a certain length of pipe, to clog alterative cells just like checker manner at the end surface of the upstream side of the substrate. Meanwhile, downstream plugs were formed at the end surface of the downstream side of the substrate by clogging the cells that did not have upstream plugs. Thereafter the substrate was calcined at 1,400° C., and a honeycomb structure having inlet-side cells and outlet-side cells was formed.

Consecutively, a coating layer was formed on the resulting honeycomb structure by wash-coating the slurry including mainly alumina powder whose average particle diameter was 0.5 μm, drying it at 110° C., and thereafter calcining it at 450° C. By changing the number of coating processes, several honeycomb structures with various amounts of coating were manufactured. Meanwhile, with alumina powder whose average particle diameter was 3 μm, several other honeycomb structures with various amounts of coating were manufactured in the same manner.

Figure 7:
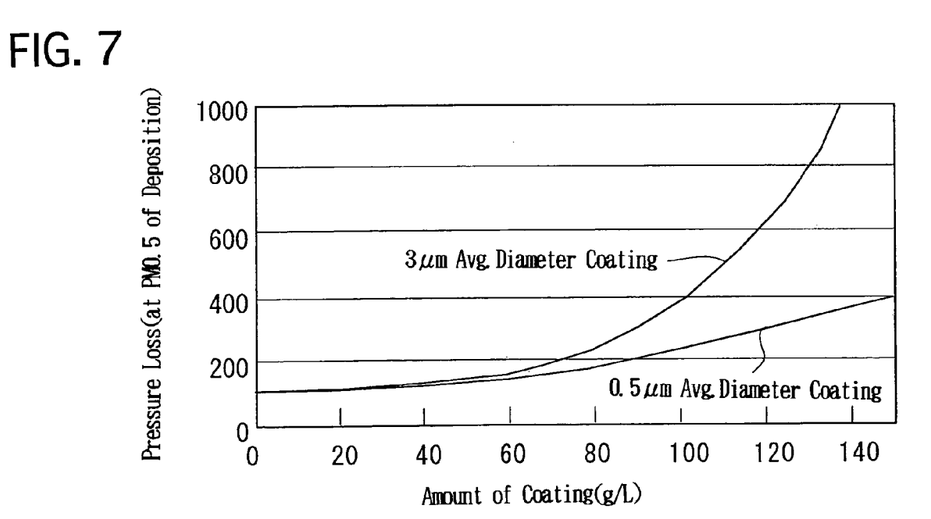
FIG. 7 is a graph showing the pressure loss as a function of the amount of coating.

Several honeycomb structures with various amounts of coating and, for a comparison, the one without coating were installed respectively in an exhaust system of a 2 L-diessel engine. Then the exhaust gas with an inlet gas temperature of 200° C. was flowed under the condition of 1600 rpm×30 Nm, and the pressure losses were measured when 0.5 g of PMs per 1 L of honeycomb structure was deposited. FIG. 7 shows the results as the relative values where the pressure loss obtained without the coating layer was defined as 100.

From FIG. 7, it is found that when the coating amount is less than 80 g/L, the pressure loss is independent on the particle diameter of alumina powder, although, as the coating amount exceeds it, the pressure loss increases rapidly for the alumina powder with large particles. Accordingly, when the coating amount is set to be 150 g/L, it is preferred that the coating amount is 75 g/L for each of the powders with average particle diameters of 0.5 μm and 3 μm, respectively. Thus the condition was determined so for the example 1.

Example No.1

Figure 1:
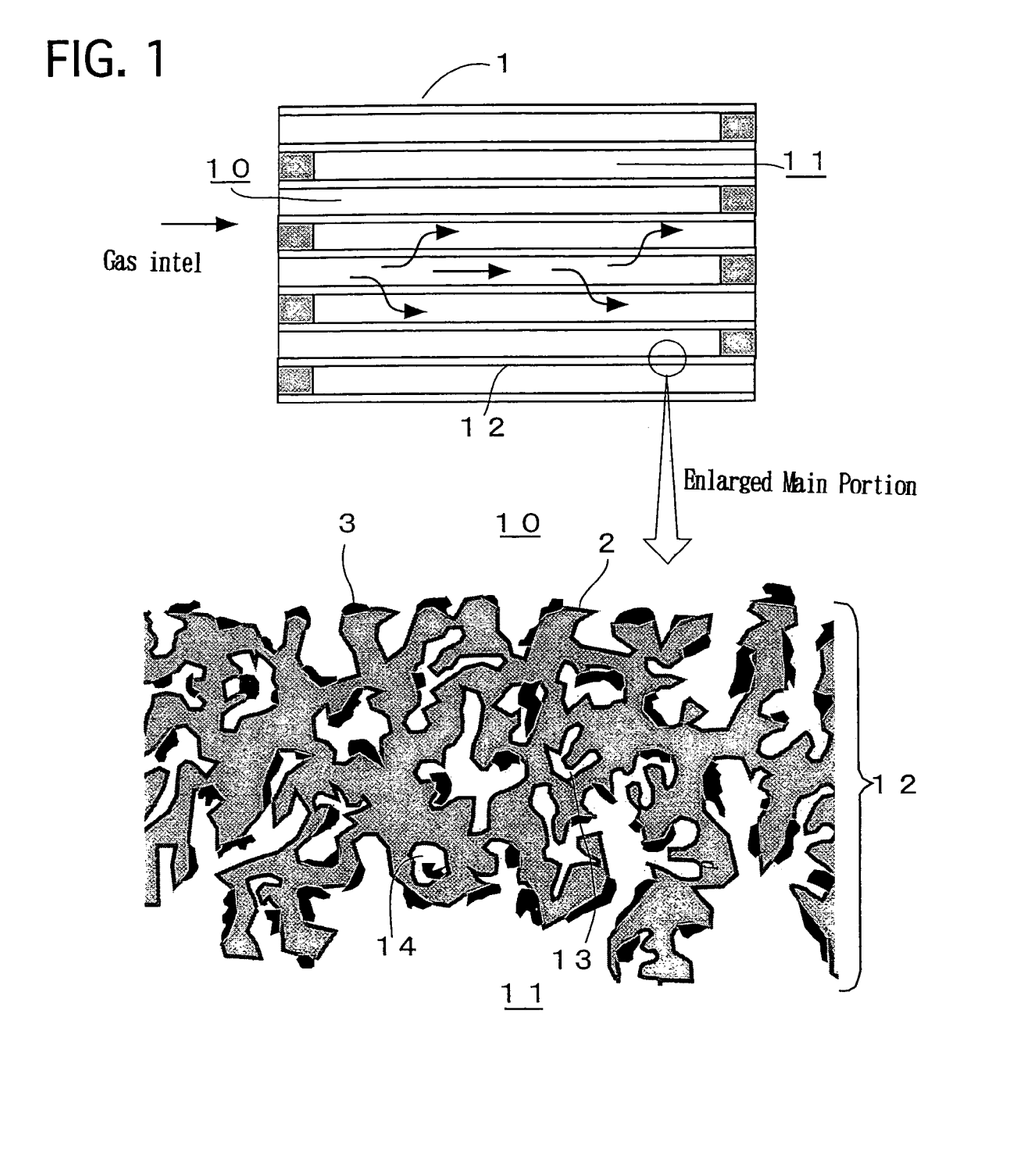
FIG. 1 is a cross-sectional view of a filter catalyst and an enlarged cross-sectional view of the main portion of the filter catalyst according to Example No.1 of the present invention.

FIG. 1 illustrates a cross-sectional view of the filter catalyst for purifying exhaust gases of the present example and an enlarged cross-sectional view of the main portion of the filter catalyst. This filter catalyst for purifying exhaust gases comprises a honeycomb structure 1, the first catalytic layer 2 and the second catalytic layer 3, which are formed on the filter cellular walls 12 of the honeycomb structure 1.

The honeycomb structure 1 comprises the inlet cells 10 clogged on the downstream side of the exhaust gases, outlet cells 11 neighboring the inlet cells 10 and clogged on the upstream side of the exhaust gases, filter cellular walls 12 demarcating the inlet cells 10 and the outlet 11 cells. There are small pores 13 with small diameters and large pores 14 with large diameters randomly on the filter cellular walls 12. The first catalytic layer 2 is formed almost homogeneously on the surface of the filter cellular walls 12, the inside surface of small pores 13 and the inside surface of large pores 14. On the other hand, the second catalytic layer 3 is formed, as upper layers of the first catalytic layer 2, on the surface of filter cellular walls 12 and the inside surface of large pores 14, but is scarcely formed on the inside surface of small pores 13.

The followings explain the manufacturing process of this filter for purifying exhaust gases, including details of its composition.

A straight honeycomb-shaped substrate which had a diameter of 129 mm, a length of 150 mm and a volume of about 2,000 cm$^3$ and comprised squared-shaped cells in a quantity of 300 cells/inch$^2$ was prepared. The substrate had a porosity of 65% and pores with an average pore diameter of 23 μm.

Next, stable and shape-retaining creamy paste was prepared by mixing predetermined amounts of organic binder and water with the powder of cordierite composition comprising alumina, talc, kaolin and silica. With the resulting paste, upstream plugs were formed, using a paste injector (dispenser) with a certain length of pipe, to clog alterative cells just like checker manner at the end surface of the upstream side of the substrate. Meanwhile, downstream plugs were formed at the end surface of the downstream side of substrate by clogging the cells that did not have upstream plugs 15. Thereafter the substrate was calcined at 1,400° C., the honeycomb structure 1 which had inlet cells 10 and outlet cells 11 was formed.

Consecutively, the slurry which mainly included the powder of first catalyst support having an average particle diameter of 0.5 μm whose main compositions were alumina, titania and zirconia was flowed in the inlet cells 10 and the outlet cells 11, and the honeycomb structure 1 was wash-coated with it. Thereafter, by drying it at 110° C. and calcining it at 450° C., the first catalytic layer 2 was formed on the honeycomb structure 1. The first catalytic layer 2 was formed in 75 g per 1 L of the honeycomb structure 1.

Thereafter, the slurry which included mainly the powder of second catalyst support having an average particle diameter of 3 μm whose main compositions were alumina, titania and zirconia was flowed in the inlet cells 10 and the outlet cells 11, and the honeycomb structure 1 was wash-coated with it. Thereafter, by drying it at 110° C. and calcining it at 450° C., the second catalytic layer 3 was formed on the honeycomb structure 1. The second catalytic layer 3 was formed in 75 g per 1 L of the honeycomb structure 1.

After that, Pt, Li, Ba and K were loaded respectively by means of the impregnation method. The amounts of loading per 1 L of the honeycomb structure 1 for Pt, Li, Ba and K were 3 g, 0.2 mol, 0.1 mol and 0.05 mol, respectively.

In accordance with the process mentioned above, the powder of first catalyst support having an average diameter of 0.5 μm adheres almost homogeneous onto the surface of filter cellular walls 12, the inside surface of small pores 13 and of large pores 14. Thereby a thin and homogeneous first catalytic layer 2 is formed. When the slurry for the second catalytic support having an average diameter of 3 μm is coated, since it can hardly enter into the small pores 13, it adheres to the surface of first catalytic layer 2 at the surface of filter cellular walls 12 and the inside surface of the large pores 14. As a result, the catalytic layer 3 whose shape is convex can be formed.

Example No.2

Figure 2:
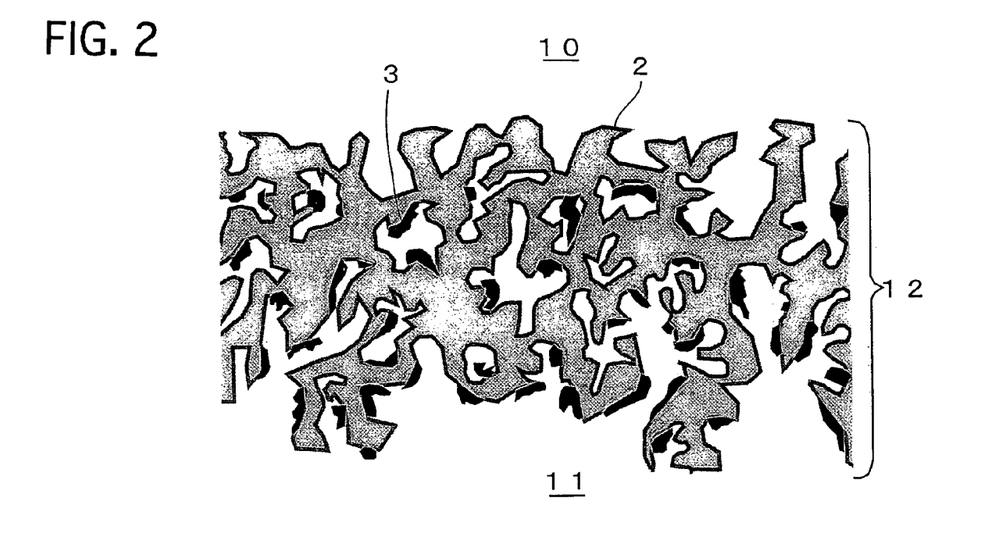
FIG. 2 is an enlarged cross-sectional view of the main portion of the filter catalyst of a filter catalyst according to Example No.2 of the present invention.

The filter catalyst for purifying exhaust gases for example 2 was prepared in the same manner as example 1 except that the slurry was flowed only in the outlet cells 11 when the second catalytic layer 3 was formed, and the second catalytic layer 3 was formed in 50 g per 1 L of the honeycomb structure 1.

The filter catalyst for purifying exhaust gases has the same constitution as shown in FIG. 2 except that the second catalytic layer 3 is not formed on the surface of the filter cellular walls 12 of the inlet cells 10.

Example No.3

The slurry including mainly the powder of first catalyst support having an average particle diameter of 0.5 μm, whose main compositions were alumina, titania and Pt—Pd-loaded zirconia, was flowed in the inlet cells 10 and the outlet cells 11, and the honeycomb structure 1 having the first catalytic layer 2 was wash-coated with it. Thereafter, by drying it at 110° C. and calcining it at 450 ° C., the first catalytic layer 2 was formed on the honeycomb structure 1. The first catalytic layer 2 was formed in 75 g per 1 L of the honeycomb structure 1.

It should be noted that Pt—Pd-loaded zirconia is the $NO_x$-adsorbing member, which is the zirconia powder on which Pt—Pd composite metal is loaded by impregnating with colloidal platinum and aqueous solution of palladium nitrate. In the first catalytic layer 1 thus obtained, Pt and Pd were loaded in an amount of 1.5 g per 1 L of the honeycomb structure 1, respectively.

Consecutively, the slurry including mainly the powder of second catalyst support having an average particle diameter of 3 μm whose main compositions were alumina, titania and zirconia was flowed in the outlet cells 11, as in example 2, and the honeycomb structure 1 having the first catalytic layer 2 was wash-coated with it. Thereafter, by drying it at 110° C. and calcining it at 450° C., the second catalytic layer 3 was formed on the honeycomb structure 1. The second catalytic layer 3 was formed in 50 g per 1 L of the honeycomb structure 1.

After that, Pt, Li, Ba and K were loaded respectively on the second catalytic layer 3 by means of the impregnation method in which aqueous solution was flowed only in the outlet calls 11. The loaded amounts, on the second catalytic layer 3, per 1 L of the honeycomb structure 1 for Pt, Li, Ba and K were 3 g, 0.2 mol, 0.1 mol and 0.05 mol, respectively.

Comparative Example 1

The filter catalyst for purifying exhaust gases for comparative example 1 was prepared in the same manner as example 1 except that the powder of the second catalyst support with an average particle diameter of 3 μm was used to form the first catalytic layer 2 and the powder of the first catalyst support with an average particle diameter of 0.5 μm was used to form the second catalytic layer 3.

Comparative Example 2

The filter catalyst for purifying exhaust gases for comparative example 2 was prepared in the same manner as example 1 except that the first catalytic layer 2 was formed in 150 g per 1 L of the honeycomb structure 1 but the second catalytic layer 3 was not formed.

<Test•Evaluation>

The filter catalyst for purifying exhaust gases for examples 1, 2 and comparative examples 1, 2 were installed respectively in an exhaust system of a 2 L-dissel engine. Then the exhaust gas was flowed under the condition of 2450 rpm×52 Nm, lean steady, an amount of smoke of 6.5% which was measured by a smoke meter and the inlet gas temperature of 300° C., and the behavior of the pressure loss and the amount of collected PMs were measured. The relations between the amount of collected PMs and the pressure loss, and between the amount of collected PMs and PMs collecting ratio were shown in FIG. 3 and FIG. 4, respectively.

Figure 3:
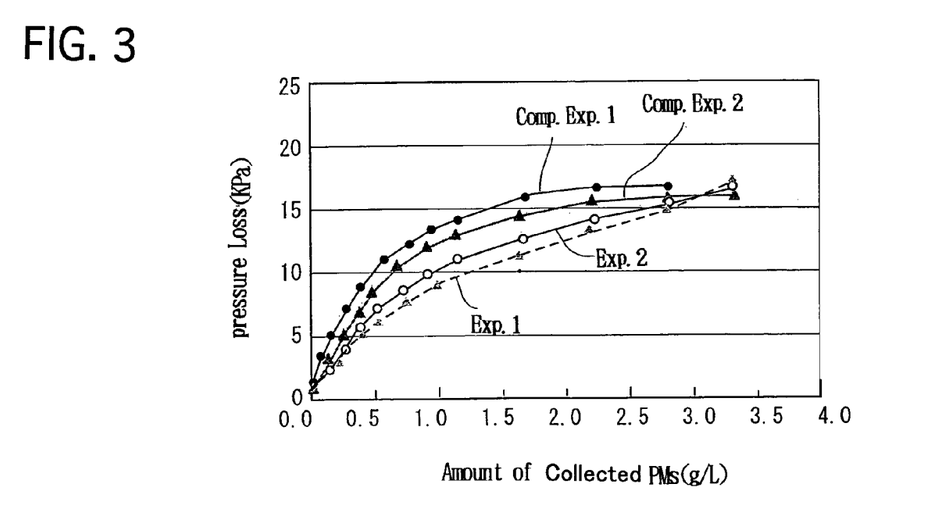
FIG. 3 is a graph showing the pressure loss as a function of the amount of collected PMs.
Figure 4:
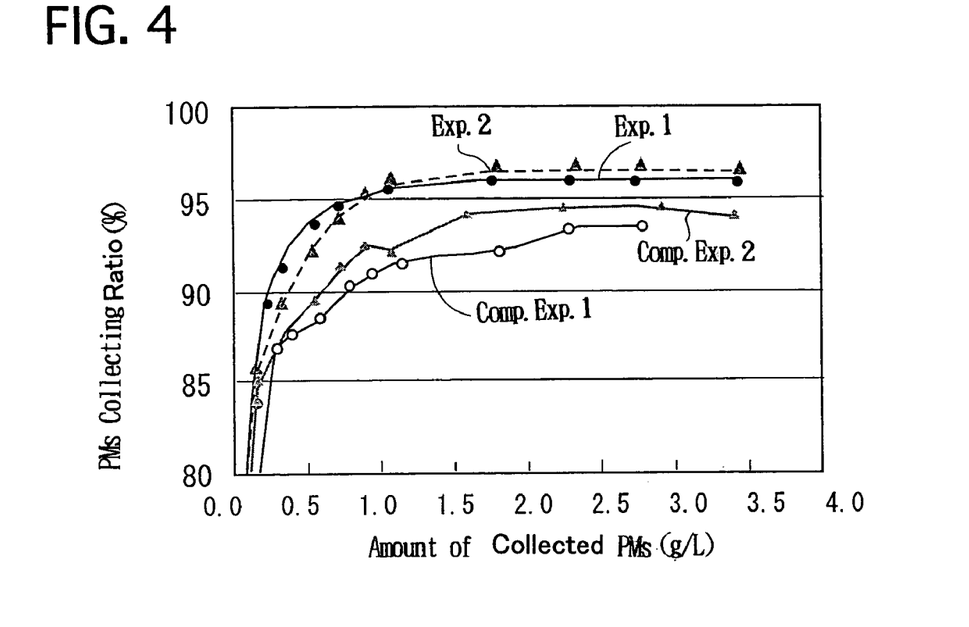
FIG. 4 is a graph showing the PMs collecting ratio as a function of the amount of collected PMs.

It can be found from FIG. 3 that the curve of catalyst for each example is more like straight lines as compared with that for each comparative example and, since the pressure loss is approximately proportional to the amount of collected PMs, the deterioration of the sensitivity for the pressure loss detection for catalyst of each example is suppressed as compared with that for each comparative example. It is also found from FIG. 4 that the catalyst for each example has a high PMs collecting ratio as compared with that for each comparative example.

Therefore, the present invention of the filter catalyst for purifying exhaust gases makes it possible to collect PMs efficiently. Moreover, since it has a high sensitivity for pressure loss detection, it is also possible to estimate the amount of PMs deposition by detecting the pressure loss. Hence it is possible to burn PMs deposition away while its amount is small, by the regeneration process in such a manner as streaming high temperature exhaust gases when the pressure loss exceeds a reference value. Thereby, it is preventable that the continuously regenerative DPFs become high temperature in burning and the failures like damage by dissolution of substrate occur.

Next, the filter catalyst for purifying exhaust gases for examples 1 to 3 and comparative examples 1, 2 were installed respectively in an exhaust system of a 2 L-dissel engine. Then, after running 200 km under 11 Lap mode (i.e. inlet gas temperature of 220~370° C.), the PMs oxidation ratio was calculated from the weight difference between amounts of PMs in the inlet gas minus PMs in the outlet gas and the deposited PMs remaining. The results are shown in FIG. 5.

On the other hand, the filter catalyst for purifying exhaust gases for examples 1 to 3 and comparative examples 1, 2 were installed respectively in an exhaust system of a 2 L-dissel engine. Consecutively, after a heat duration in which the exhaust gas at 650° C. was flowed for 50 hrs, the exhaust gas in which light oil was added was flowed under the condition of 2900 rpm×80 Nm and the inlet gas temperature of 300° C., and the amount of sorbed $NO_x$ was measured for each. The results obtained are shown FIG. 6. It should be noted that diesel oil was so added that the fuel consumption deterioration rate was to be 3%.

Figure 5:
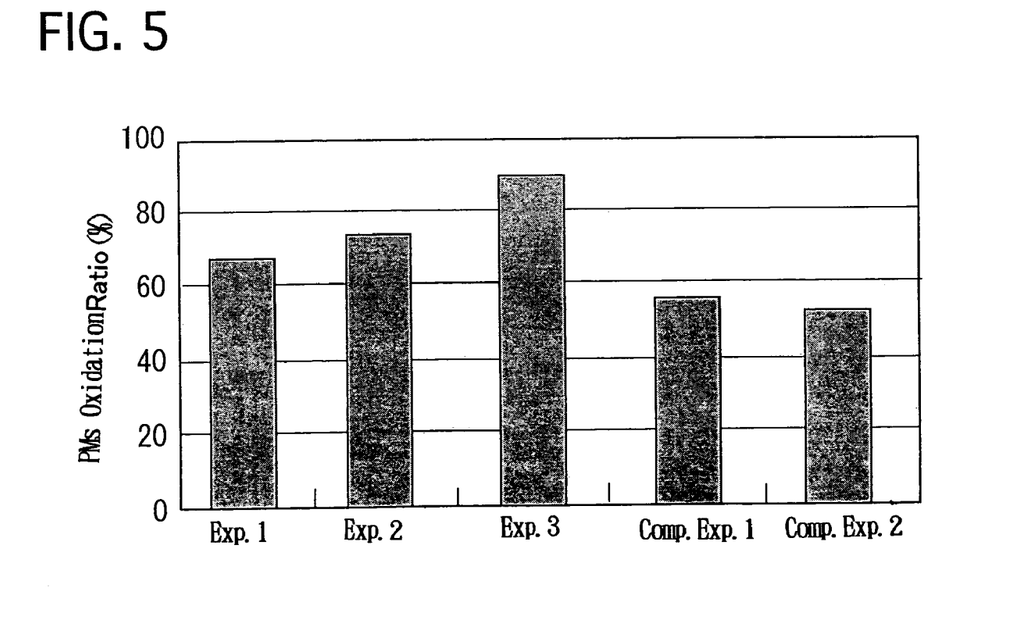
FIG. 5 is a graph showing the PMs oxidation ratio for catalysts of Examples and Comparative Examples.

FIG. 5 clarifies that the catalyst for each example shows high PMs oxidation ratio as compared with that for each comparative example, and excels in purification ability for PMs. The PMs oxidation ability for example 2 is higher than that for example 1. It is considered that, since the second catalytic layer 3 was not formed on the surface of inlet cells 10, the amount of PMs flowing into the pores of the filter cellular walls 12 increased and the possibility for catalytic reaction of the catalytic ingredient to the collected PMs was enhanced. Although the PMs oxidation ratio for example 3 is further larger than that for example 2, it is considered that PMs were oxidized also by $NO_2$ released from the $NO_x$-adsorbing catalyst (Pt—Pd loaded zirconia).

Figure 6:
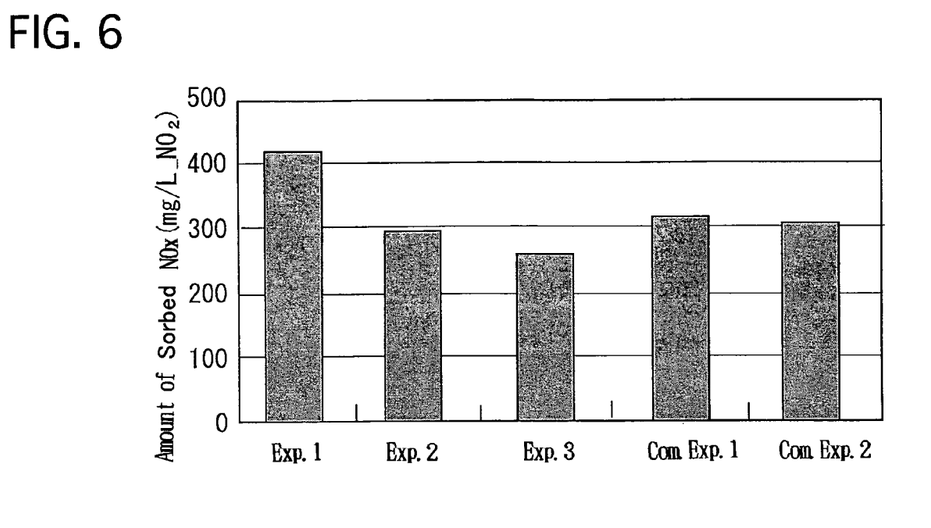
FIG. 6 is a graph showing the amount of sorbed $NO_x$ after duration for catalysts of Examples and Comparative Examples.

Moreover, it is found from FIG. 6 that the amount of sorbed $NO_x$ after duration for catalyst of example 1 is larger than that of each comparative example. It can be considered that, since the catalytic layer is thick where the second catalytic layer 3 is formed, the reaction of $NO_x$ sorbent to the filter cellular walls is suppressed. The $NO_x$-sorbing abilities for example 2 and example 3 are inferior to that for example 1. It is considered that the coating amounts of the second catalytic layer 3 for example 2 and 3 were less than that for example 1.

On the other hand, in comparative examples 1, since the powder of the second catalyst support comprising large particles was coated before the powder of first catalyst support comprising small particles was formed, the space between the second catalyst supports each other was filled with the powder of the first catalyst support. Therefore it is considered that the uneven surface of the catalytic layer was scarcely formed consequently. Thereby effectiveness cannot be found in the pressure loss behavior or the PM collecting ratio as well as comparative examples 2, hence comparative example 1 shows properties equals with comparative examples 2.

Having now fully described the present invention, it will be apparent to one of ordinary skill in the art that many changes and modifications can be made thereto without departing from the spirit of the present invention as set forth herein including the appended claims.

What is claimed is:

1. A filter catalyst for purifying exhaust gases comprising:
   a honeycomb structure including:
      inlet cells clogged on the downstream side of the exhaust gases;
      outlet cells neighboring the inlet cells and clogged on the upstream side of the exhaust gases;
      filter cellular walls demarcating the inlet cells and outlet cells, and having pores of an average pore diameter of from 20 to 40 μm; and
      a catalytic layer formed on the filter cellular walls and on the inside surface of the pores, and having:
         a first catalyst support having a first thickness, comprising a porous oxide material with an average particle diameter of 1 μm or less, and being arranged along the inside surface of the pores of the filter cellular walls;
         a second catalyst support having a second thickness greater than the first thickness of the first catalyst support, comprising a porous oxide material with an average particle diameter within a range from about 1/20 to 1/2 of the average pore diameter of the filter cellular walls, and being arranged in the pores of the filter cellular walls so as to partially cover the first catalyst support; and
         a catalytic ingredient.

2. The filter catalyst set forth in claim 1, wherein the second catalyst support is loaded on a portion of the first catalyst support.

3. The filter catalyst set forth in claim 1, wherein a porosity of the filter cellular walls is from 60 to 80%.

4. The filter catalyst set forth in claim 1, wherein the catalytic layer contains an $NO_x$ absorbent selected from alkali metals, alkali earth metals or rare-earth elements, which is loaded at least on one of the first catalyst support and the second catalyst support.

5. The filter catalyst set forth in claim 2, wherein the catalytic layer contains an $NO_x$ absorbent selected from alkali metals, alkali earth metals or rare-earth elements, which is loaded at least on one of the first catalyst support and the second catalyst support.

6. The filter catalyst set forth in claim 3, wherein the catalytic layer contains an $NO_x$ absorbent selected from alkali metals, alkali earth metals or rare-earth elements, which is loaded at least on one of the first catalyst support and the second catalyst support.

7. The filter catalyst set forth in claim 1, wherein the catalytic layer contains an $NO_x$-absorbing member, by which $NO_x$ is absorbed at low temperatures and is released at high temperatures.

8. The filter catalyst set forth in claim 2, wherein the catalytic layer contains an $NO_x$-absorbing member, by which $NO_x$ is absorbed at low temperatures and is released at high temperatures.

9. The filter catalyst set forth in claim 3, wherein the catalytic layer contains an $NO_x$-absorbing member, by which $NO_x$ is absorbed at low temperatures and is released at high temperatures.

10. The filter catalyst set forth in claim 4, wherein the catalytic layer contains an $NO_x$-absorbing member, by which $NO_x$ is absorbed at low temperatures and is released at high temperatures.

11. The filter catalyst set forth in claim 1, wherein the catalytic layer contains an $NO_x$-absorbing member, comprising a powder including at least zirconia and ceria, and noble metal loaded on said powder.

12. The filter catalyst set forth in claim 2, wherein the catalytic layer contains an $NO_x$-absorbing member, comprising a powder including at least zirconia and ceria, and noble metal loaded on said powder.

13. The filter catalyst set forth in claim 3, wherein the catalytic layer contains an $NO_x$-absorbing member, comprising a powder including at least zirconia and ceria, and noble metal loaded on said powder.

14. The filter catalyst set forth in claim 4, wherein the catalytic layer contains an $NO_x$-absorbing member, comprising a powder including at least zirconia and ceria, and noble metal loaded on said powder.

15. The filter catalyst set forth in claim 1, wherein the first catalyst support has a first thickness and the second catalyst support has a second thickness greater than the first thickness of the first catalyst support.

* * * * *